United States Patent [19]
Fertig

[11] 3,740,562
[45] June 19, 1973

[54] RETRO-REFLECTIVE TYPE DETECTOR HEAD WITH FAIL-SAFE FEATURE

[75] Inventor: Raymond Baines Fertig, Ronceverte, W. Va.

[73] Assignee: Appalachian Electronic Instruments, Inc., Ronceverte, W. Va.

[22] Filed: Feb. 17, 1972

[21] Appl. No.: 227,161

[52] U.S. Cl. ... 250/219 DF, 250/219 WE, 250/221, 250/239
[51] Int. Cl. ...... G01n 21/32, G06m 7/00, H01j 5/02
[58] Field of Search ............. 250/219 WE, 219 DF, 250/237, 239, 221

[56] References Cited
UNITED STATES PATENTS

| | | | |
|---|---|---|---|
| 3,530,690 | 9/1970 | Nickell et al. | 250/219 WE |
| 3,360,654 | 12/1967 | Müller | 250/221 |

Primary Examiner—James W. Lawrence
Assistant Examiner—T. N. Grigsby
Attorney—Thomas B. Van Poole, S. Ellwood Wilson and Francis A. Keegan et al.

[57] ABSTRACT

An optical detector head system for projecting light rays toward a surface to be inspected and receiving reflected light from the inspection zone to detect selected conditions, which detector head system includes fail-safe components to produce a failure indicating signal upon failure of the light source in the detector head. The detector head includes a photodetector device, and retro-reflective surface portions disposed relative to the light source and the photodetector to direct a selected quantum of light to the photodetector when the light source is illuminated at normal intensity, and fail-safe circuitry is included responsive to the output signals from the photodetector to produce a failure indicating signal when the output signals fall below a selected amplitude.

12 Claims, 8 Drawing Figures

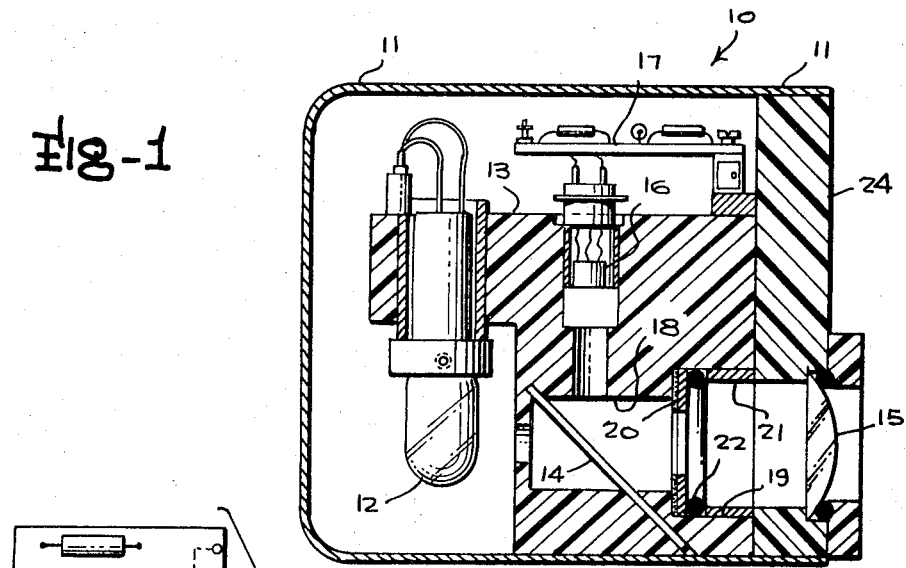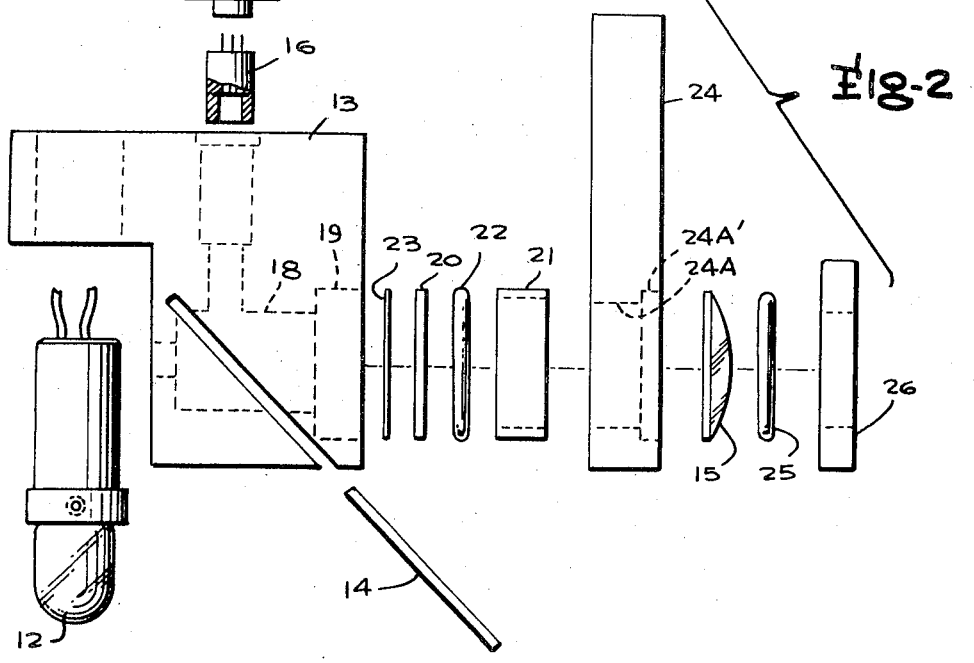

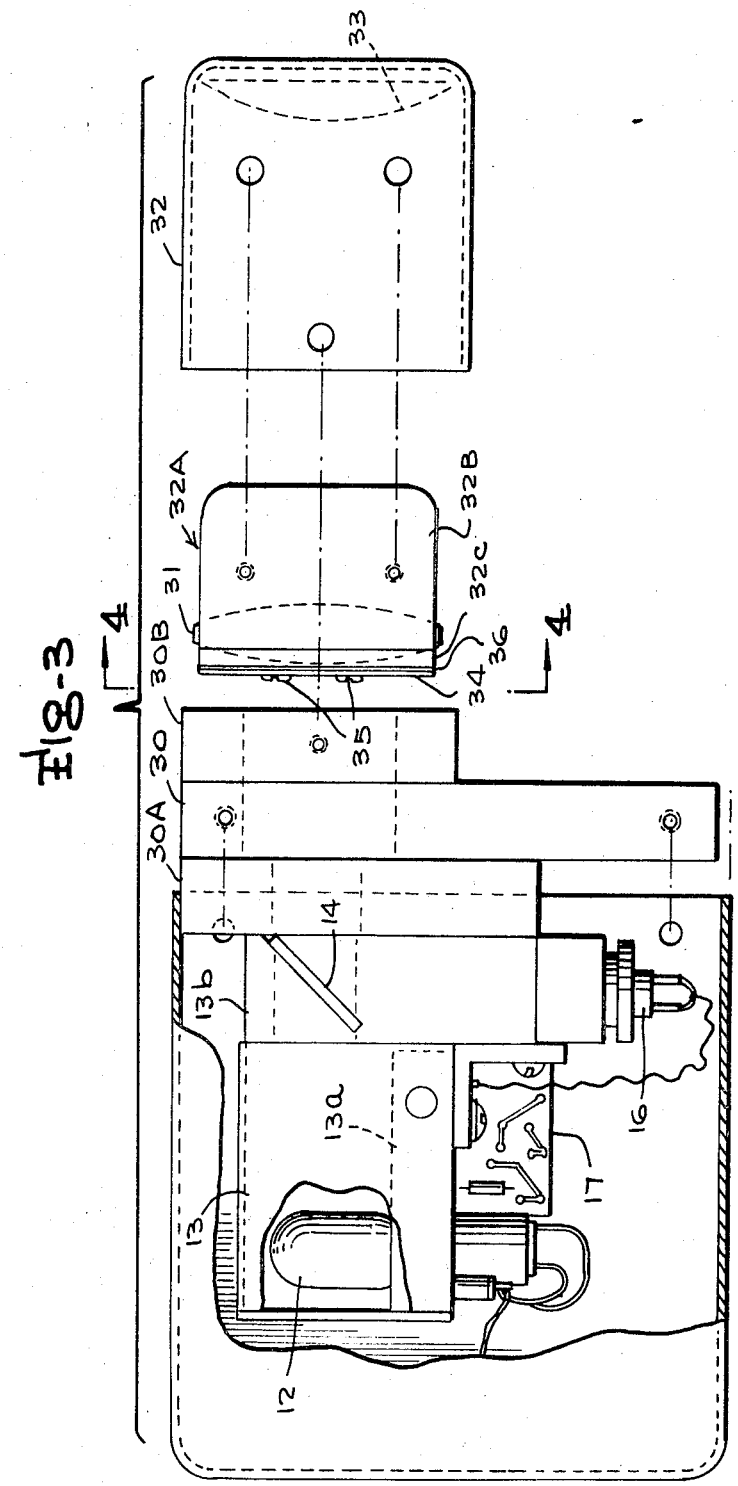

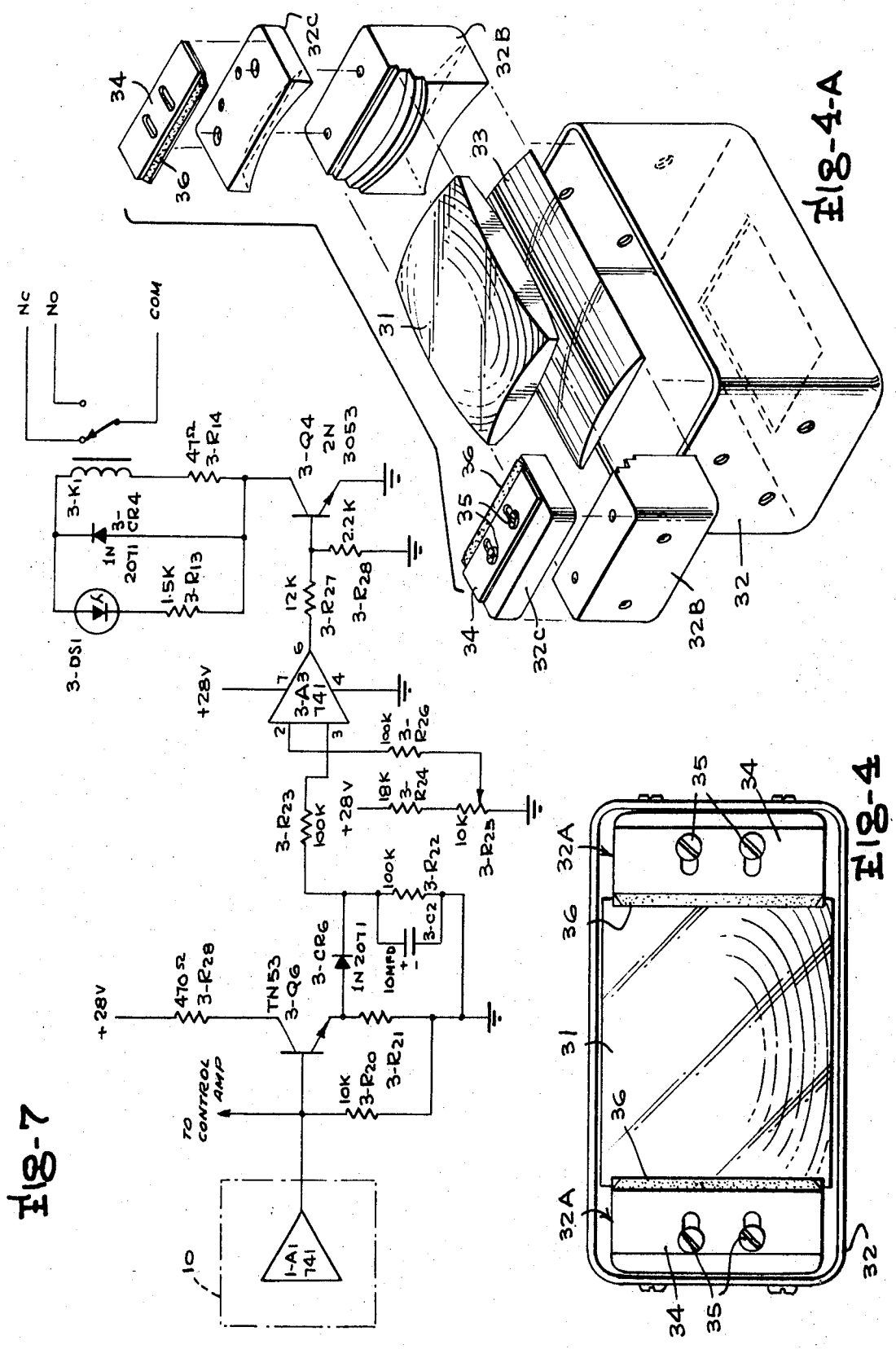

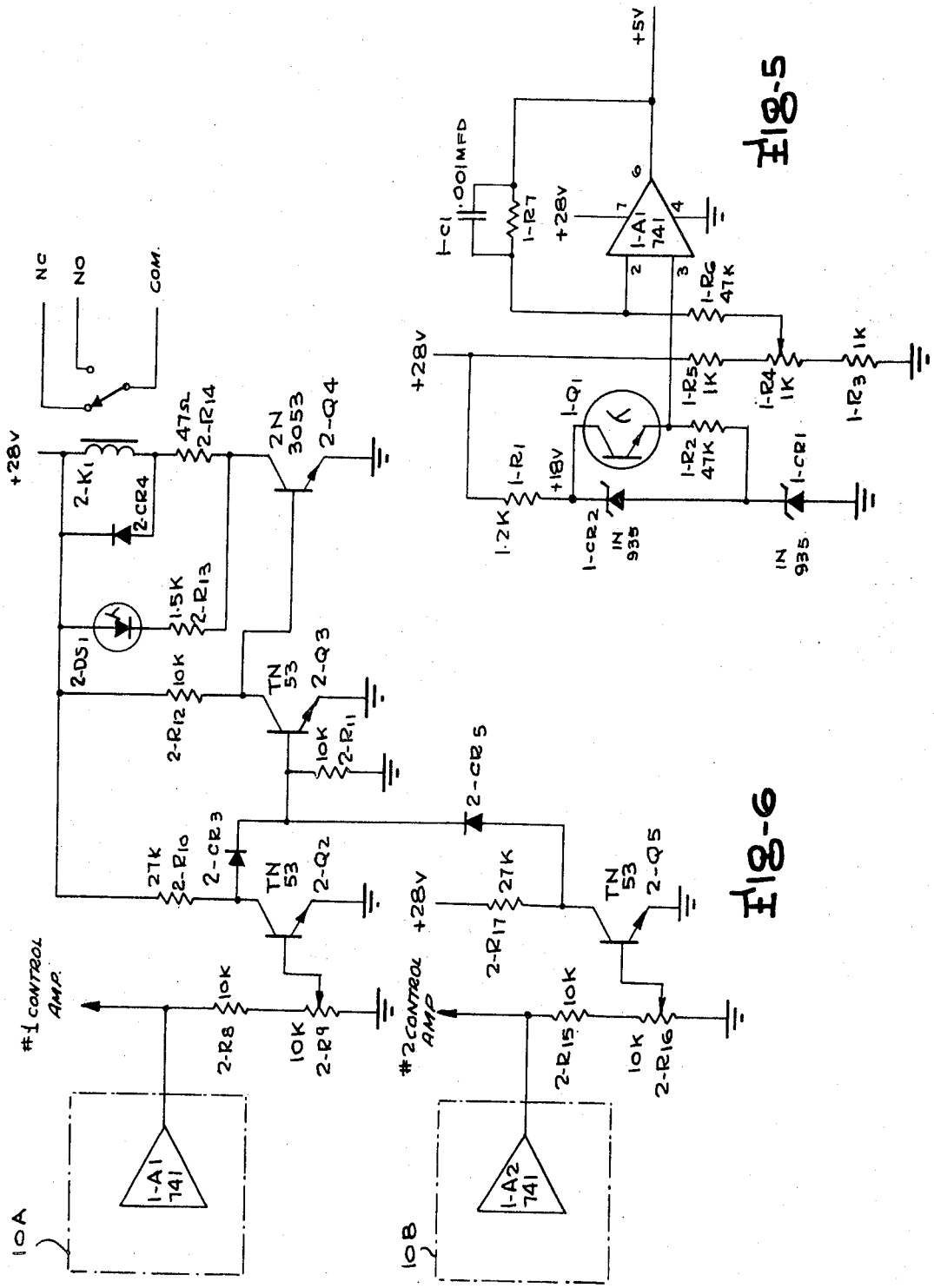

RETRO-REFLECTIVE TYPE DETECTOR HEAD WITH FAIL-SAFE FEATURE

BACKGROUND AND OBJECTS OF THE INVENTION

The present invention relates in general to optical systems such as detector heads and the like for detecting flaws in fabrics or knitted webs, or for detecting defects, marks or the like on moving panels or objects moving in a path sensed by the detector head. More particularly, the present invention relates to such optical systems, particularly of the type commonly referred to as retro-reflective detector heads, wherein fail-safe means are provided to activate an alarm or an identifying signal when the light source fails so as to provide an immediate indication that the detector head system is operating improperly.

Detector heads of the type incorporating both a light source or lamp and a photo-detector, such as a photo-transistor or the like, together with an optical system and a semi-transparent or two way mirror have come into common use, especially in connection with fabric flaw detecting systems, stop motion systems for knitting machines, and similar devices, where light is transmitted from the lamp through the semi-transparent mirror and lens system onto the fabric surface, but only a very low level of light is reflected back from the fabric surface being monitored until a hole occurs. U. S. Pat. Nos. 3,345,835 and 3,385,971 disclose examples of such retro-reflective detecting heads, wherein retro-reflective tape or a target is disposed in the path of the transmitted beam or light rays and is reflected back from the target when a hole occurs. Also, detector heads of similar design have been used to detect chalk marks, paste marks or other reflective markings on objects, such as on veneer in the lumber industry, for the purpose of automatically activating a device for cutting out knot holes or other defects. In either of these types of devices, if the light source, or if a component in the detector head preamplifier circuit if such is provided, or if the connecting cable, fails, there is no way for the user to know promptly that the unit is not working properly.

An object of the present invention is the provision of a fail-safe system associated with retro-reflective detector heads and the like to provide a prompt indication when a failure of the light source, or of a component in the preamplifier or connecting cable occurs. There are also disclosed in this application fail-safe circuitry for a two channel detection system and an arrangement where an external retro-reflective target is used to generate the fail-safe signal and a time delay or storage circuit is employed in connection therewith.

These and other objects of the present invention will become apparent from the following detailed description, taken in conjunction with the accompanying drawings illustrating preferred embodiments of the invention.

BRIEF DESCRIPTION OF THE FIGURES

FIG. 1 is a vertical section view through a detector head for a retro-reflective defect detecting system incorporating the fail-safe features of the present invention;

FIG. 2 is an exploded view of the components of the detector head;

FIG. 3 is a side elevation view of the detector head components for a further modification employing two strips of retro-reflective tape for the fail-safe operation;

FIG. 4 is a vertical section view taken along the line 4—4 of FIG. 3;

FIG. 4A is a fragmentary exploded perspective view of the lens mounting assembly;

FIG. 5 is a schematic diagram of the preamplifier circuit located in the detector head;

FIG. 6 is a schematic diagram of the fail-safe circuitry for a two channel detection system; and FIG. 7 is a schematic diagram of a form of time delay and storage circuitry which can be utilized with a system employing external retro-reflective targets for generating the fail-safe signal.

DETAILED DESCRIPTION OF PREFERRED EMBODIMENTS

Referring to the drawings, wherein like reference characters designate corresponding parts throughout the several figures, and particularly to FIGS. 1 and 2, there is shown a simple retro-reflective type detector head, indicated generally by the reference character 10, such as may be employed in a fabric flaw detecting system as illustrated in U. S. Pat. No. 3,385,971. The retro-reflective detecting head includes an outer case or housing 11 in which is provided a lamp 12, such as a G.E. type 872 lamp. The lamp 12 is supported in an appropriate bore in a portion of a mounting block 13 which is properly drilled and cut to support a semi-transparent mirror or two way mirror 14, a plano-convex lens 15, a photo-detector 16, and a preamplifier 17 formed on a printed circuit board. As disclosed in the above-identified earlier U. S. Pat. No. 3,385,971, the mounting block is cut along a portion thereof at a 45° angle to the surface of the bottom edge as illustrated in FIG. 2 to form a kerf of appropriate width and depth to receive and fix in position the semi-transparent mirror. Before insertion of the mirror 14, a bore 18 of relatively smaller diameter is formed in the block 13 from a location near the wall of the block nearest the lamp to a selected intermediate point, and a larger diameter bore 19 extends forwardly from the constricted bore 18.

A mounting ring 20 is held in place near the rearmost end of the larger diameter bore 19 by a bushing 21 and O-ring 22, and a ring of retro-reflective tape 23 is attached to the rear or left side of the mounting ring 20 and extends inwardly some distance from the boundary of the smaller diameter bore 18 to cause a suitable amount of light from the lamp 12 to be reflected back to the photo-detector 16, which is usually a photo-transistor.

A mounting plate 24 is fixed to the right hand surface of the mounting block 13 as viewed in FIG. 2 and has a suitable diameter bore 24a therein having an enlarged portion 24a' at its forward end for receiving and seating the plano-convex lens 15. An O-ring 25 and a lens retaining ring 26 complete the assembly for supporting the lens 15 in the assembly.

FIGS. 3 and 4 disclose a more complicated type of a retro-reflective detector head wherein two strips of retro-reflective tape are added for fail-safe operation. In the detector head disclosed in FIGS. 3 and 4, the lamp 12 is supported by a mounting block portion 13a within a housing 13 fixed by a bracket to a second mounting block portion 13b in which the semi-transparent mirror 14 and photo-detector 16 are supported. In this embodiment, a main mounting plate 30 having back and front mounting plate sections 30A and 30B is provided. A first lens, such as a double convex lens 31, is supported by a pair of laterally spaced mounting assemblies 32A secured within a lens cover 32 which is fastened to the mounting plate section 30B. A second lens, such as a cylindrical lens 33, is provided in the lens cover 32. The mounting assemblies may comprise forward mount sections 32B having curved lens receiving cavities in their confronting faces for the lateral edges of lenses 31 and 33, and rear mount sections 32C secured by screws to sections 32B to support lens 31. Such a detector head may be used to detect holes or runs in knitted fabric or to detect pieces of tape on large diameter wire as part of a wire length measuring system, and,because of the cylindrical lens 33, is a line of light type of detector head to form the light into a line instead of a spot of light. Operation is similar to the detector heads shown in FIGS. 1 and 2 and the same preamplifier 17 is used. Two adjustable masks 34 are mounted on the rear mount sections 32C of the lens mount assemblies 32A and supported by screws 35 to support pieces of retro-reflective tape 36, so as to make adjustment of the output voltage range of the detector head more flexible. Some applications such as hole detecting devices require high sensitivity while detecting pieces of tape in other applications does not require very much sensitivity. If the internal pieces of tape 36 were too large in a high sensitivity head, saturation might occur in the photo-transistor 16 or preamplifier 17 and the head would be useless. The adjustable masks 34 alleviate this problem and make calibration of the detector head much easier.

The preamplifier circuit formed on the preamplifier printed circuit board 17 is illustrated in FIG. 5, and is located in the detector head for a better signal-to-noise ratio. When light is reflected back from the tape 23 of the FIG. 1 form of detector head or the tape strips 36 of the FIGS. 3-4 type of detector head, to the semi-transparent mirror 14, and then to the photo-transistor 16, indicated in FIG. 5 as 1-Q1, a voltage is developed across resistor 1-R2. This voltage is applied to the non-inverting input 3 of amplifier 1-A1. A voltage divider consisting of resistor 1-R3, bias adjusting potentiometer 1-R4, and resistor 1-R5 is connected from the +28 volt power supply to ground. The feedback network consisting of resistors 1-R6 and 1-R7 is connected between potentiometer 1-R4 and the output 6 of amplifier A1. By adjusting potentiometer 1-R4, it is possible to set the output voltage of amplifier 1-A1 to a suitable level, 5 volts in a typical example, for the fail-safe circuitry. By using potentiometer 1-R4, the exact amount of tape 23 is not too critical and the gain of the amplifier 1-A1 can be varied over wide limits by changing the value of calibrating resistor 1-R7.

Since a photo-transistor may have a sensitivity spread of typically 10 to 1 from unit to unit, particularly at low light levels, a calibrating resistor should be used. This arrangement greatly simplifies the calibration of the detector head for a given application and enables the output level of amplifier 1-A1 to be set at the desired operating voltage for the fail-safe circuitry while providing a large voltage swing for amplifier 1-A1, more than 20 volts when using a +28 volt power supply.

Resistor 1-R1 sets the proper current for Zener diodes 1-CR1 and 1-CR2. Zener diode 1-CR1 and the voltage drop across resistor 1-R2 sets the voltage applied to the non-inverting input 3 of amplifier 1-A1 while Zener diode 1-CR2 sets the maximum voltage that can be applied to photo-transistor 1-Q1. This permits the use of photo-transistors having low breakdown voltages. Capacitor 1-C1 is used to limit the high frequency response of amplifier 1-A1 to eliminate noise signals sometimes generated by other electrical equipment which if not suppressed could cause false stops. To better understand the operation of amplifier 1-A1, assume that a +10 volt signal is applied to the non-inverting input 3 of the amplifier 1-A1. If a slightly more positive voltage is applied to the inverting input 2 of amplifier 1-A1 by adjusting bias potentiometer 1-R4, the output of amplifier 1-A1 can be set at +5 volts, the desired output voltage for amplifier 1-A1. If the light source should burn out, the voltage at the non-inverting input 3 of amplifier 1-A1 would drop to +9 volts. Assuming a gain of two in amplifier 1-A1, this would cause its output voltage to drop to +3 volts. Higher gain would cause the output voltage of amplifier 1-A1 to drop to an even lower value.

A two channel detection system operating off of the output of amplifier 1-A1 is illustrated schematically in FIG. 6. In this two channel detection system, it is assemed that two detector heads such as the detector head 10, will be employed each having its own preamplifier 17, the circuitry of which may correspond to the circuitry of FIG. 5. In the fail-safe circuitry for the two channel detection system of FIG. 6, the output from the amplifier 1-A1 of the number one or first detector head, indicated by reference character 10A in FIG. 6, is applied to a voltage divider consisting of resistor 2-R8 and fail-safe adjusting potentiometer 2-R9. The slider of the potentiometer 2-R9 is connected to the base of transistor 2-Q2. The potentiometer 2-R9 is adjusted until transistor 2-Q2 is saturated which causes its collector voltage to drop to about 100 millivolts. This removes the forward bias from the base of transistor 2-Q3 and prevents it from conducting, which causes the collector voltage of transistor 2-Q3 to rise thus placing the forward bias on transistor 2-Q4. This turns on transistor 2-Q4 and causes the light emitting diode 2-DS1 and the relay coil of 2-K1 to become energized. Relay 2-K1 is operated in a normally energized state to take care of a possible failure of the +28 volt power supply as well as other component failures. If the light in the detector head should fail or even lose intensity, transistor 2-Q2 will come out of saturation, transistor 2-Q3 will become forward biased, and transistor 2-Q4 will be cut off. The fail-safe indicator 2-DS1 and relay 2-K1 will become deenergized thus causing the relay to fall out and to perform a suitable alarm or shut down function.

Transistor 2-Q5 has its base connected to the slider of potentiometer 2-R16 which forms a voltage divider with resistor 2-R15, to which the output of the amplifier 1-A2 of the number two detector head 10B is applied, and operates in the same manner as transistor 2-Q2 of the upper channel. Transistor 2-Q5 in conjunction with diodes 2-CR3 and 2-CR5 forms an OR gate, permitting operation of another detection channel. If additional channels are needed, as in the case of a four channel scanning unit, it is only necessary to add two other channels like the number two channel and connect them together at the base of the transistor 2-Q3.

It will be apparent that where a single detector head is being used, only the upper channel portion of the circuitry of FIG. 6 need be used, and the transistor 2-Q5 and its associated resistors and diode 2-CR5 can be eliminated.

All detector heads do not need the internal retro-reflective tape for fail-safe operation. Some systems have external retro-reflective targets which can be used to generate the fail-safe signal. In this category are counting and sorting systems where the light beam is intercepted by each moving object such as a can or box. To prevent such a system from actuating the fail-safe system, some form of time delay or storage circuitry is needed. One example of a time delay or storage circuit which may be employed in such an application is shown in FIG. 7. In the circuit shown in FIG. 7, the voltage generated at the output of the amplifier A1 of detector head 10 as a result of the light being reflected back from a retro-reflective target is applied to the base of transistor 3-Q6. This voltage causes transistor 3-Q6 to be forward biased which causes current to flow through resistor 3-R21 and diode 3-CR6. The current flowing through diode 3-CR6 charges capacitor 3-C2 to a voltage of about 1.2 volts lower than the detector head voltage due to the voltage drops in the transistor 3-Q6 and the diode 3-CR6. This voltage is applied to the non-inverting terminal 3 of comparator 3-A3 through resistor 3-R23 and causes its output voltage at terminal 6 to go positive if it is higher in value than the voltage at inverting terminal 2 of comparator 3-A3. By setting fail-safe adjusting potentiometer 3-R25 in the voltage divider consisting of resistor 3-R24 and potentiometer 3-R25 to the correct value, it is possible to cause the output voltage of comparator 3-A3 to switch from a high value of about +26 volts to a low value of about +2 volts with a very small change in the voltage from the detector head and capacitor 3-C2. Capacitor 3-C2 serves as a storage device and prevents normal interruption of the light beam from operating the fail-safe circuitry. The time constant of the circuit can be increased by making the value of capacitor 3-C2 larger or decreased by making the value of capacitor 3-C2 smaller or decreasing the value of resistor 3-R22. Resistors 3-R27 and 3-R28 form a voltage divider to cause transistor 3-Q4 to be on when comparator 3-A3 is high, and off when comparator 3-A3 is low. When transistor 3-Q4 conducts which is the normal condition, indicator light 3-DS1 and relay 3-K1 are energized for fail-safe operation. When transistor 3-Q4 cuts off, indicator light 3-DS1 and relay 3-K1 are deenergized. Diode 3-CR4 suppresses the inductive kick from relay 3-K1 which could damage the transistor 3-Q4. and off when comparator 3-A3 is low. When transistor 3-Q4 conducts which is the normal condition, indicator light 3-DS1 and relay 3-K1 are energized for fail-safe operation. When transistor 3-Q4 cuts off, indicator light 3-DS1 and relay 3-K1 are deenergized. Diode 3-CR4 suppresses the inductive kick from relay 3-K1 which could damage the transistor 3-Q4.

Retro-reflective type detector heads normaly use a tungsten lamp as a light source. However, other sources of radiation can be used such as visible and infrared emitting diodes. They can also be used either in the continuous current or pulsed type of operation. The circuitry of FIG. 6 is best suited for the continuous current mode of operation as the relay 2-K1 would tend to not energize unless the duty cycle of the pulsed radiation was unusually long. It would also try to allow the repetition rate of the pulsed signal. The circuitry of FIG. 7 is very well suited for a pulsed light source because it responds to the peak of the detector head signal and stores this value in capacitor 3-C2. The signal applied to the input of comparator 3-A3 has very little ripple content due to capacitor 3-C2 even with short duty cycle pulses. It is desirable to use a short duty cycle on solid state light emitters in order to avoid heating problems and to generate a more intense radiation signal. Peak radiated power of pulsed type emitters may be as much as ten times the continuous current power rating provided the duty cycle is small.

What is claimed is:

1. An optical detector head system including fail-safe components for projecting light rays toward an inspection zone and receiving reflected light from said inspection zone upon occurrence of selected conditions therein to be detected, comprising a detector head including a lamp forming a light source, a semi-transparent mirror and a lens system located along a main optical axis for projecting light from said lamp passing through said mirror and lens system along said main axis in a first direction toward said inspection zone, said detector head including a photo-detector located along a branch optical axis and intersecting the main axis at said mirror to receive light passing through said lens system toward said mirror in a second direction opposite to said first direction, said fail-safe components including retro-reflective means incorporated in the detector head for retro-reflecting at least a selected quantum of light in said second direction along said main axis to said mirror whenever the lamp is illuminated at normal intensity to direct the rectro-reflected light to said photo-detector, and fail-safe circuity responsive to the output signal levels produced by said photo-detector to produce a failure indicating signal when said output signal levels fall below a selected amplitude.

2. An optical detector head system incorporating fail-safe components, as defined in claim 1, wherein said retro-reflective means comprise surface portions of retro-reflective material located internally of the detector head between said mirror and said lens system spaced radially outwardly from said main optical axis to retro-reflect a portion of the incident light from said lamp to said photo-detector to maintain a selected output signal level therefrom while said lamp is illuminated to normal intensity.

3. An optical detector head system incorporating fail-safe components, as defined in claim 1, wherein said retro-reflective means comprise an annular ring of retro-reflective material located internally of the detector head between said mirror and said lens system arranged concentric with said main optical axis to retro-reflect a portion of the incident light from said lamp to said photo-detector to maintain a selected output signal level therefrom while said lamp is illuminated to normal intensity.

4. An optical detector head system incorporating fail-safe components, as defined in claim 2, wherein said surface portions are strips of retro-reflective material, said system including opaque adjustable mask members covering selected portions of the strips of retro-reflective material to vary the quantum of light retro-reflected by the strips and thereby vary the range of output voltage levels produced by the detector head.

5. An optical detector head system incorporating fail-safe components, as defined in claim 1, wherein said fail-safe circuitry includes amplifier means coupled to said photo-detector for producing an output voltage level of selected value when the lamp is illuminated at normal intensity, and a detector channel coupled to said amplifier means including a transistor stage and manually adjustable means for regulating the amplitude of the amplifier output voltage applied thereto to operate the transistor stage in a first selected state and to cause the transistor stage to operate in a second selected state when the amplifier output voltage drops below said selected value, and indicator signal control means activated responsive to said transistor stage operating in said second state to cause production of said failure indicating signal.

6. An optical detector head system incorporating fail-safe components, as defined in claim 2, wherein said fail-safe circuitry includes amplifier means coupled to said photo-detector for producing an output voltage level of selected value when the lamp is illuminated at normal intensity, and a detector channel coupled to said amplifier means including a transistor stage and manually adjustable means for regulating the amplitude of the amplifier output voltage applied thereto to operate the transistor stage in a first selected state and to cause the transistor stage to operate in a second selected state when the amplifier output voltage drops below said selected value, and indicator signal control means activated responsive to said transistor stage operating in said second state to cause production of said failure indicating signal.

7. An optical detector head system incorporating fail-safe components, as defined in claim 3, wherein said fail-safe circuitry includes amplifier means coupled to said photo-detector for producing an output voltage level of selected value when the lamp is illuminated at normal intensity, and a detector channel coupled to said amplifier means including a transistor stage and manually adjustable means for regulating the amplitude of the amplifier output voltage applied thereto to operate the transistor stage in a first selected state and to cause the transistor stage to operate in a second selected state when the amplifier output voltage drops below said selected value, and indicator signal control means activated responsive to said transistor stage operating in said second state to cause production of said failure indicating signal.

8. An optical detector head system incorporating fail-safe components, as defined in claim 4, wherein said fail-safe circuitry includes amplifier means coupled to said photo-detector for producing an output voltage level of selected value when the lamp is illuminated at normal intensity, and a detector channel coupled to said amplifier means including a transistor stage and manually adjustable means for regulating the amplitude of the amplifier output voltage applied thereto to operate the transistor stage in a first selected state and to cause the transistor stage to operate in a second selected state when the amplifier output voltage drops below said selected value, and indicator signal control means activated responsive to said transistor stage operating in said second state to cause production of said failure indicating signal.

9. An optical detector head system incorporating fail-safe components, as defined in claim 1, wherein said fail-safe circuitry includes amplifier means coupled to said photodetector producing an output voltage level of selected value when the lamp is illuminated at normal intensity, and a detector channel coupled to said amplifier means including a transistor stage, manually adjustable coupling means for applying the output voltage from said amplifier means to said transistor stage to operate the latter in a state of saturation when said output voltage at least attains said value, and output signal control means energized when said transistor stage is operating in saturation to prevent generation of the failure indicating signal and to be deenergized responsive to said transistor stage coming out of saturation to produce said failure indicating signal.

10. An optical detector head system incorporating fail-safe components, as defined in claim 2, wherein said fail-safe circuitry includes amplifier means coupled to said photodetector producing an output voltage level of selected value when the lamp is illuminated at normal intensity, and a detector channel coupled to said amplifier means including a transistor stage, manually adjustable coupling means for applying the output voltage from said amplifier means to said transistor stage to operate the latter in a state of saturation when said output voltage at least attains said value, and output signal control means energized when said transistor stage is operating in saturation to prevent generation of the failure indicating signal and to be deenergized responsive to said transistor stage coming out of saturation to produce said failure indicating signal.

11. An optical detector head system incorporating fail-safe components, as defined in claim 3, wherein said fail-safe circuitry includes amplifier means coupled to said photodetector producing an output voltage level of selected value when the lamp is illuminated at normal intensity, and a detector channel coupled to said amplifier means including a transistor stage, manually adjustable coupling means for applying the output voltage from said amplifier means to said transistor stage to operate the latter in a state of saturation when said output voltage at least attains said value, and output signal control means energized when said transistor stage is operating in saturation to prevent generation of the failure indicating signal and to be deenergized responsive to said transistor stage coming out of saturation to produce said failure indicating signal.

12. An optical detector head system incorporating fail-safe components, as defined in claim 4, wherein said fail-safe circuitry includes amplifier means coupled to said photodetector producing an output voltage level of selected value when the lamp is illuminated at normal intensity, and a detector channel coupled to said amplifier means including a transistor stage, manually adjustable coupling means for applying the output voltage from said amplifier means to said transistor stage to operate the latter in a state of saturation when said output voltage at least attains said value, and output signal control means energized when said transistor stage is operating in saturation to prevent generation of the failure indicating signal and to be deenergized responsive to said transistor stage coming out of saturation to produce said failure indicating signal.

* * * * *